United States Patent [19]

Tejima et al.

[11] Patent Number: 4,870,442
[45] Date of Patent: Sep. 26, 1989

[54] AUXILIARY LIGHT PROJECTING APPARATUS FOR A FOCUS DETECTING SYSTEM

[75] Inventors: Yasuyuki Tejima; Saburo Sugawara; Hideaki Yuda, all of Tokyo, Japan

[73] Assignee: Asahi Kogaku Kogyo Kabushiki Kaisha, Tokyo, Japan

[21] Appl. No.: 218,389

[22] Filed: Jul. 13, 1988

Related U.S. Application Data

[63] Continuation-in-part of Ser. No. 29,924, Mar. 25, 1987, Pat. No. 4,771,308.

[30] Foreign Application Priority Data

Mar. 25, 1986 [JP] Japan .................................. 61-66967
Feb. 6, 1987 [JP] Japan .................................. 62-26124

[51] Int. Cl.$^4$ .......................... G03B 3/00; G01J 1/20
[52] U.S. Cl. ..................................... 354/403; 250/201
[58] Field of Search ................. 354/403, 415, 165; 356/1, 4; 250/201 AF, 552, 553, 237 R, 237 G, 496.1, 503.1, 368, 370, 393

[56] References Cited

U.S. PATENT DOCUMENTS 4,690,538 9/1987 Matsui et al. ....................... 354/403

FOREIGN PATENT DOCUMENTS

148709 9/1982 Japan .

Primary Examiner—W. B. Perkey
Attorney, Agent, or Firm—Sughrue, Mion, Zinn, Macpeak and Seas

[57] ABSTRACT

An auxiliary light source for a passive focus detector, such as would be used for automatic focusing. A projection lens is inclined with respect to the imaging lens and projects a patterned image from a surface inclined with respect to the projection lens. Preferably the patterned image is projected to lie along the axis of the imaging lens so that a sharp illumination pattern is formed at all distances along that axis. Preferably the pattern is such that a higher intensity portion is imaged at a far distance and a lower intensity portion is imaged at a near distance.

8 Claims, 9 Drawing Sheets

AUXILIARY LIGHT PROJECTING APPARATUS FOR A FOCUS DETECTING SYSTEM

This is a Continuation-in-part, of application Ser. No. 029,924 filed Mar. 25, 1987, now U.S. Pat. No. 4,771,308.

BACKGROUND OF THE INVENTION

1. Field of the Invention

The present invention relates to a focus detecting (auto-focus) auxiliary or supplementary light projecting device in a passive automatic focusing apparatus which is used with still cameras, movie cameras and other photographic equipment.

2. Background of the Invention

There are two prinicipal approaches to automatic focusing used in present-generation photographic equipment. The methods can be categorized as active or passive. In the active system, a beam of infrared light or ultrasonic waves is projected onto the scene or object to be imaged and the resulting reflected light or echo is received and used to calculate the distance to the object. One problem with this approach is that the range over which distance measurement can be achieved is substantially limited by the maximum distance that can be covered by infrared light or ultrasonic waves. Therefore, automatic focusing of a single-lens reflex cameras and other photographic equipment that employs lenses of long focal distance as well as these of short focal distance is chiefly accomplished by the passive method which utilizes available ambient light to directly effect image detection.

Passive automatic focus detection with cameras is most commonly achieved by what is generally referred to as the correlation method. According to this method, a pair of light-receiving devices (e.g. CCDs, i.e., charge coupled devices) each having a plurality of light-receiving areas are used. By comparing the photoelectric output of a light-receiving area in one device with the output from the corresponding light-receiving area in the other device, the point where closest matching between the two outputs occurs is detected and used as the proper focused point. This correlation method, however, is not highly suitable for focus detection in a dark scene because a relatively small amount of light will be emitted from the scene for reception by the light-receiving devices. This approach requires good lighting and contract conditions of sometimes fails if the scene is dark or has a low contrast.

This problem could be solved by flooding the object with auxiliary light from the direction of the camera. However, if auxiliary illuminating light is simply projected from a location in the neighborhood of the optical axis of imaging lenses in the camera, the illumination falls perpendicularly on the object and is reflected from the object to produce a strong specular or skin reflection component, which will return to the camera so as to reduce the contrast of the object.

The auxiliary light should not cause glare to the person in the scene and, to this end, it generally has a relatively long wavelength (e.g. 700 nm) in the low luminosity range where the human eye is practically insensitive. However, the low-contrast phenomenon described in the preceding paragraph becomes pronounced if the object is illuminated with auxiliary light of long wavelength. With a view to avoiding this problem, it has been proposed that a pattern of alternating light and dark vertical lines be projected for providing a contract for the object. Therefore, the auxiliary light projecting devices in current use are designed to deliberately provide contrast for the object by projecting as striped pattern onto the object.

Figure 1:
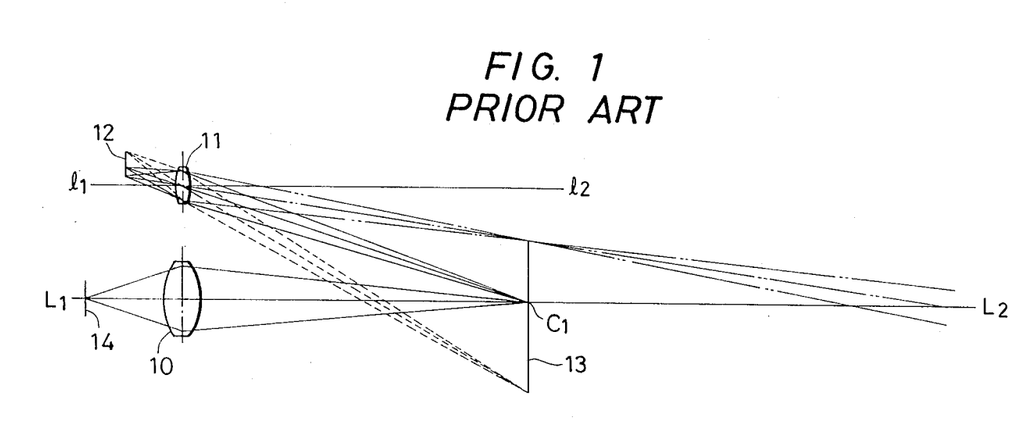
FIG. 1 is a side view of the optical system used in the first example.
Figure 2:
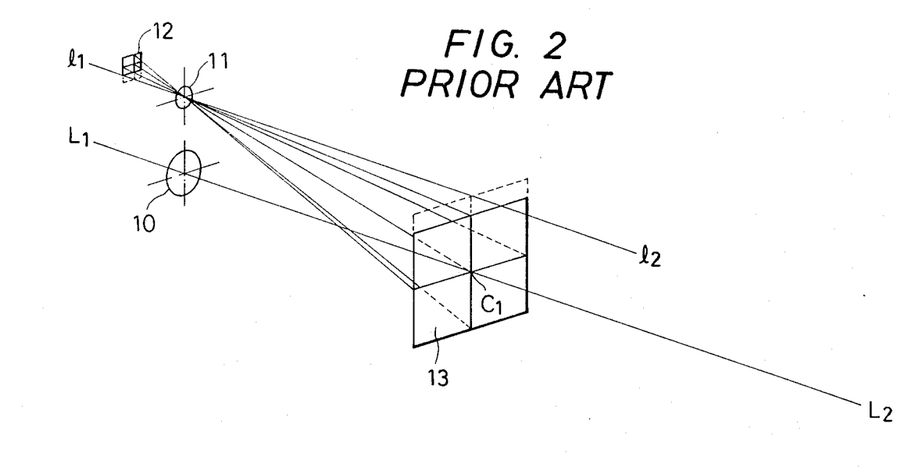
FIG. 2 is a perspective view of the same optical system.

An example of the system that operates on this principle is shown schematically in FIGS. 1 and 2. The system illustrated in these drawings is intended to be used for a camera equipped with a through-the-lens (TTL)-type auto-focusing (AF) mechanism and an imaging lens 10 also serves as a lens in the focus detecting system.

The imaging lens 10 and a projection lens 11 are arranged in such a manner that the optical axis $L_1$–$L_2$ of the imaging lens is parallel to the optical axis $l_1$–$l_2$ of the projection lens 11. A patterned surface 12 that is disposed in a direction perpendicular to the optical axis $l_1$–$l_2$ is offset upwardly by a predetermined amount with respect to the axis $l_1$–$l_2$.

A light source (not shown) is disposed in the back of the patterned surface 12 and light coming from this source passes through the patterned surface 12 and the projection lens 11 to form a patterned image 13 at point $C_1$ on the optical axis $L_1$–$L_2$ of the imaging lens 10. In FIG. 1, a film surface 14 is located behind the imaging lens 10.

The system shown in FIGS. 1 and 2 produces a focused patterned image 13 if the object is within a very small distance range including point $C_1$. However, if the object is outside of this range, only a blurred patterned image 13 is produced and the necessary contrast cannot be imparted to the object. With a view to expanding the focusing range of patterned image 13, the F number of the projection lens 11 may be increased so as to provide a greater depth of focus but then, the amount of light available for the patterned image 13 is excessively decreased to put constraint on the range over which proper focus detection can be achieved.

Another problem with the system depicted in FIGS. 1 and 2 is that the gap between the optical axes $l_1$–$l_2$ and $L_1$–$L_2$ causes parallax on account of the distance from the object. As a result, the actual focusing range of this system is limited by whichever is the smaller of the range limited by the pattern dimensions and the range limited by the depth of focus.

Figure 3:
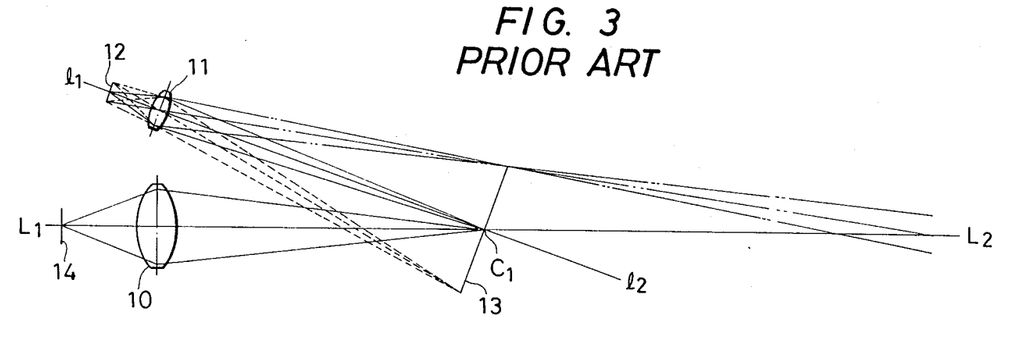
FIG. 3 is a side view of the optical system used in the second example.
Figure 4:
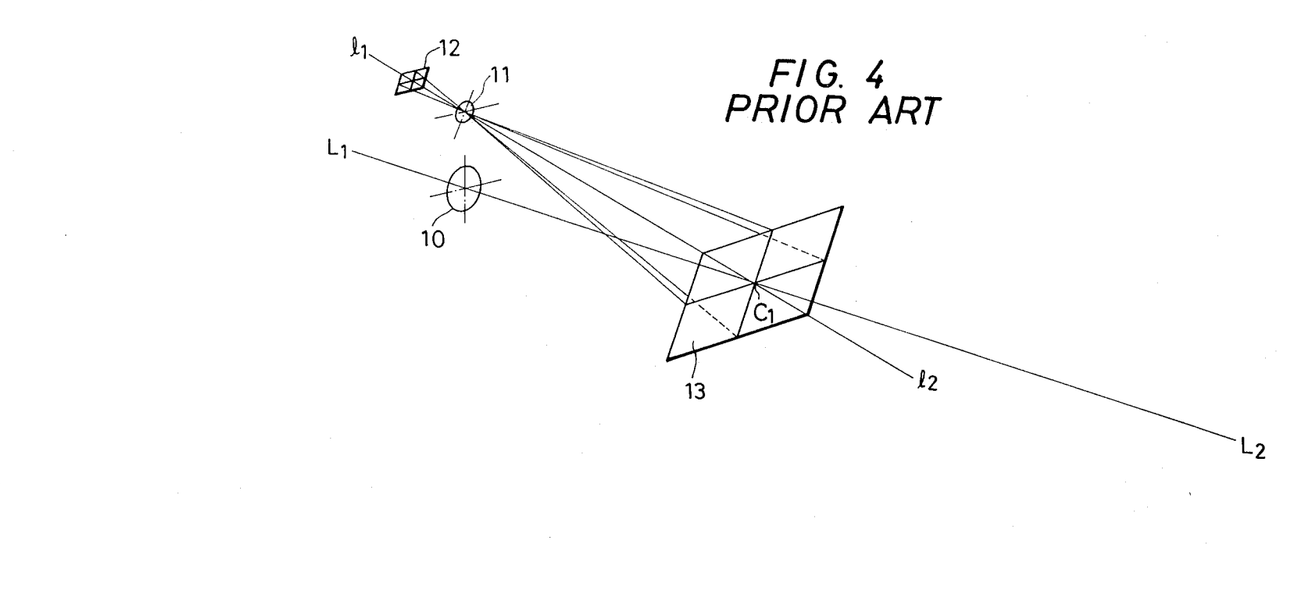
FIG. 4 is a perspective view of the same optical system.

Another system that embodies the idea of projecting a striped pattern is shown in FIGS. 3 and 4. In this system, the projection lens 11 and imaging lens 10 are so positioned that the optical axis $l_1$–$l_2$ of the projection lens 11 will cross the optical axis $L_1$–$L_2$ of the imaging at a point $C_1$ on the imaging optical axis $L_1$–$L_2$. The patterned surface 12 is disposed to cross the projecting optical axis $l_1$–$l_2$ at a right angle so that a patterned image 13 inclined to the imaging optical axis $L_1$–$L_2$ will be formed at point $C_1$. This system provides a somewhat broader focusing range than the system shown in FIGS. 1 and 2 but it still has the disadvantage that a blurred image of the patterned image 13 will be formed outside of this focusing range.

Figures 5, 6:
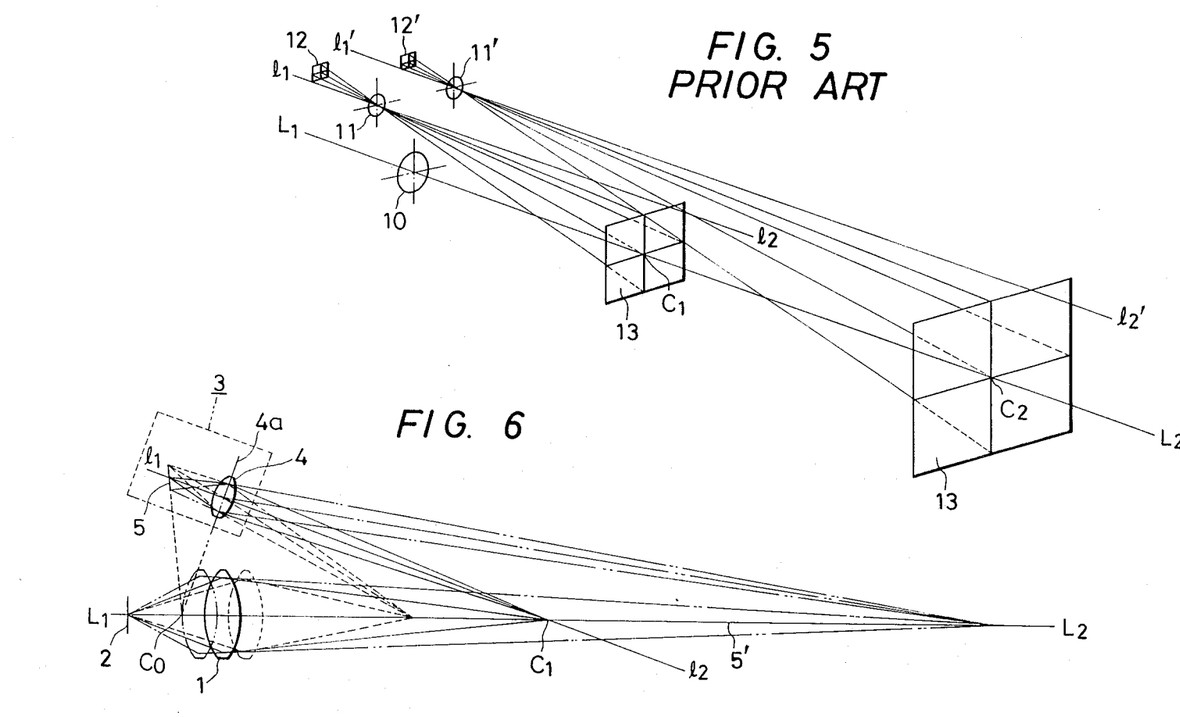
FIG. 5 is a perspective view of the optical system used in the third example.
FIG. 6 is a side view showing the configuration of the optical system used in the apparatus.

Therefore, in the actual system available commercially today, two units of the auxiliary light projecting system shown in FIG. 1 are together provided as shown in FIG. 5. In this arrangement, light issuing from a light source (not shown) passes through the patterned surface 12 and projection lens 11 to form a patterned image 13 at point $C_1$ on the imaging optical axis $L_1$–$L_2$, while light coming from another light source (not shown) passes through another patterned surface 12' and projection lens 11' to form a second patterned image 13' at another point $C_2$ on the imaging optical axis $L_1$–$L_2$.

This commercial system has the advantage that the focusing range can be expanded to a certain extent while effectively compensating for parallax. However, even this system does not offer a complete solution to the aforementioned problems and the focusing range that can be attained is limited to be within the depths of focus of $C_1$ and $C_2$. In addition, a compact system cannot be fabricated because it is necessary to install two projector units in, for example, an accessory strobe apparatus rather than in the camera body itself.

A TTL-type active AF system adapted to a TV zoom lens is shown on page 457 (47) of Kogaku (Optics), 10, 6 published by the Meeting on Optics, the Society of Applied Physics of Japan, December 1981. This system projects auxiliary light through an imaging lens and provides a wide-focusing range. However, it requires that an image-focusing lens which matches the imaging lens be provided in front of both the light-emitting and the light-receiving devices. Therefore, the system cannot be readily adapted to a single-reflex lens camera which requires easy lens changing in its operation.

SUMMARY OF THE INVENTION

The present invention has been accomplished in order to solve the aforementioned problems of the prior art.

Accordingly, an object of the present invention is to provide an auto-focus auxiliary light projecting apparatus in which the focusing range of patterned image to be projected on the object is expanded to enable the object to be provided with an adequate contrast over a wide range of distance.

Another object of the invention is to provide such a device which, in addition, can be fabricated in a sufficiently small size to be incorporated in the body of photographic equipment such as a camera.

According to one aspect of the present invention, a patterned surface for forming a patterned image is inclined with respect to a plane that extends through a projection lens at a right angle with respect to its optical axis so that a patterned image plane is conjugate to the patterned surface will be formed in a spatially inclined manner with respect to the patterned surface.

According to another aspect of the present invention, a patterned surface for forming a patterned image is provided as in integral part of the radiating surface of a light-emitting device that has a gradient of radiation intensity across its radiating surface. This radiating surface is inclined with respect to a plane that extends through a projection lens at a right anglel with respect to its optical axis so that a patterned image plane conjugate to the radiating surface will be formed in a spatially inclined manner with respect to the radiating surface. The light-emitting device is so positioned that its high-intensity area will illuminate an object at a far distance and its low-intensity area will illuminate an object at a near distance.

BRIEF DESCRIPTION OF THE DRAWINGS

FIGS. 1 to 5 are diagrams showing three examples of the prior art focus detecting auxiliary light projecting apparatus.

FIGS. 6 to 11 show one embodiment of the focus detecting auxiliary light projecting apparatus according to the first aspect of the present invention; FIGS. 12 to 14 show one embodiment of the focus detecting auxiliary light projecting apparatus according to the second aspect of the present invention.

DETAILED DESCRIPTION OF THE PREFERRED EMBODIMENTS

Embodiments of the present invention are hereinafter described with reference to accompanying FIGS. 6 to 14.

Inclined Patterned Surface

Figure 7:
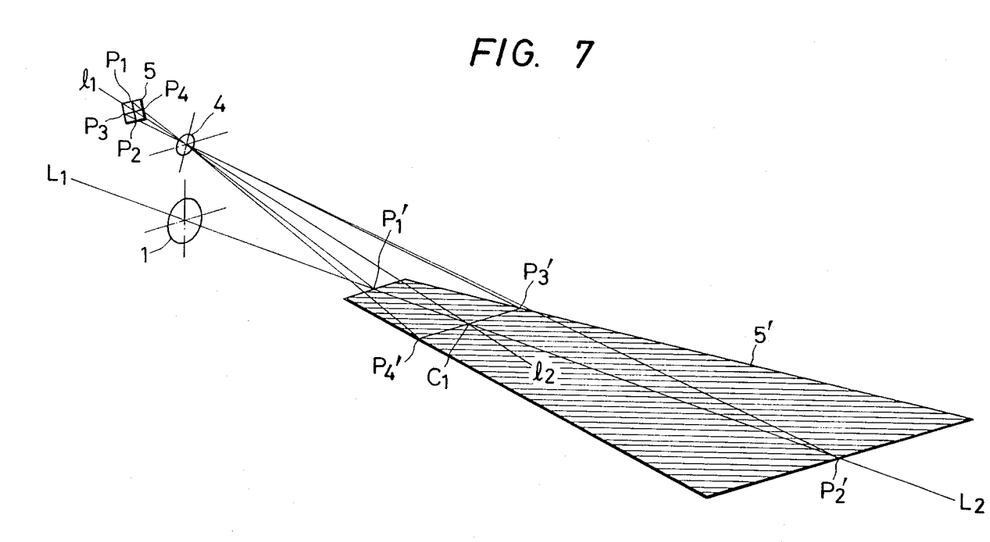
FIG. 7 is a perspective view of the same optical system.

FIGS. 6 and 7 show in a side and a perspective view, respectively, the configuration of an optical system in a focus detecting auxiliary light projecting apparatus according to one embodiment of the first aspect of the present invention. It is intended that the apparatus is applied to a camera equipped with a TTL-type AF system.

In these figures, an imaging lens 1 is included in the camera. In order for the image of an object (not shown) to be formed in focus on a film surface 2, the imaging lens 1 is adapted to be driven from the position indicated by the solid line to the position indicated by either the one-long-and-two-short dashed line or the dashed line in response to the result of focus detection.

Figure 8:
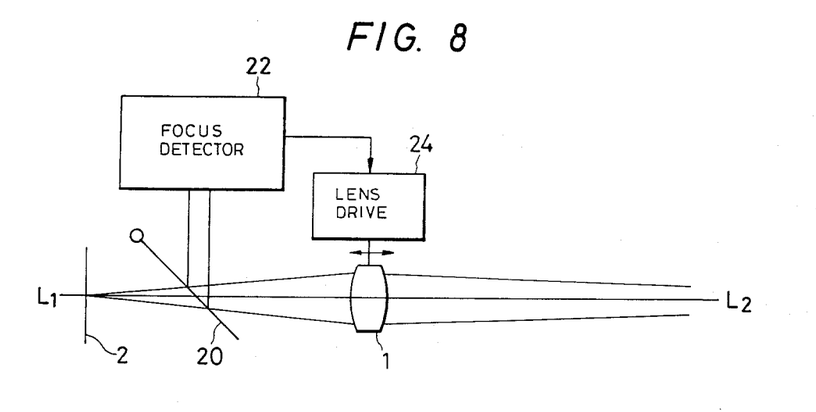
FIG. 8 is a block diagram showing the essential features of an auto-focusing system.
Figure 9:
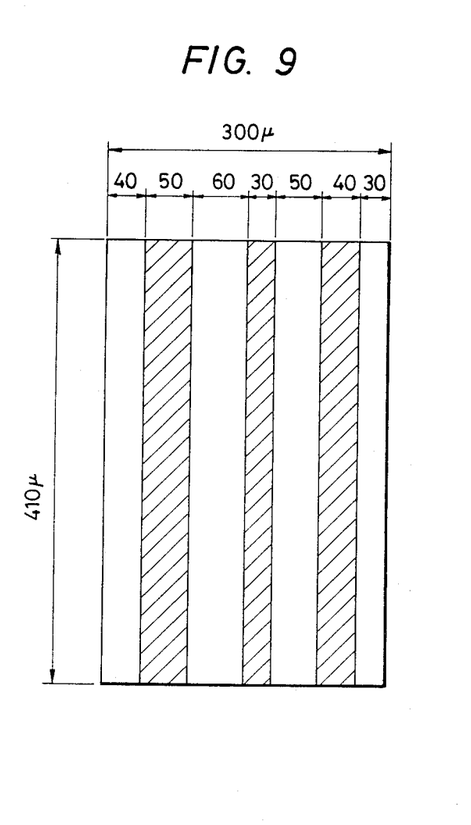
FIG. 9 is an enlarged view illustrating the basic pattern to be formed on the patterned surface shown in FIG. 6.

The imaging lens 1 also serves as a lens in the focus detecting system such that part of the light emanating from the object passing the lens 1 is reflected by a movable mirror 20, shown in FIG. 8, into a focus detecting apparatus 22 which may operate on a variety of principles of focus detecting such as by detection of contrast or by detection of phase difference. One example was described in more detail in the background section. The output of the focus detecting apparatus 22 is used by a lens drive circuit 24 to translate the imaging lens 1 along the imaging optical axis $L_1$–$L_2$ to bring the imaging lens 1 into focus with the object.

Above the imaging lens 1 is disposed, as shown in FIG. 6, a projection optical unit 3 which makes up a focus detecting auxiliary light projecting apparatus. The optical unit 3 is an integral assembly of a projection lens 4, a patterned surface 5 and a light source 6. The layout and configurations of the individual components of the optical unit 3 are described below. First, the projection lens 4 is so positioned that its optical axis $l_1$–$l_2$ is inclined to the optical axis $L_1$–$L_2$ of the imaging lens 1, with the two optical axes intersecting each other at a point $C_1$. The patterned surface 5, the light transmitting parts of which diffusely pass the light from the light source 6, is inclined to a plane 4a which passes through the projection lens 4 and which intersects its optical axis $l_1$–$l_2$ at a right angle. The projection optical unit 3 taken generally forms a tilting optical system. It is generally known that when an object plane is inclined with respect to a plane through a lens that intersects its optical axis, the resulting image plane is spatially inclined with respect to the object plane in accordance with the law of scheimpflug. Therefore, in the light projecting optical unit 3, too, a patterned image plane 5' which is a conjugate surface with respect to the patterned surface 5 will form (i.e., will be focused) in a spatially inclined manner with respect to the patterned surface 5, as shown in FIG. 7.

In the embodiment shown, the imaging lens 1 is so positioned that its optical axis $L_1$–$L_2$ will partially lie in the patterned image plane 5'. Consequently, the extension of the plane 4a which crosses the projection optical axis $l_1$–$l_2$ at a right angle will intersect the extension of the patterned surface 5 at a point $C_o$ which is located on the optical axis $L_1$–$L_2$ of the imaging lens 1.

The patterned surface 5 is provided with a pattern of alternating transparentn or translucent and opaque lines that extend longitudinally with respect to the optical axes across its surface. The pattern has an irregular or non-periodic pitches. Part of this patterned surface 5 is shown at an enlarged scale in FIG. 9 together with the dimensions of several transparent (unhatched) and opaque (cross-hatched) lines.

Light issuing from the light source 6 disposed in the back of the patterned surface 5 passes through the patterned surface and the images of points $P_1$ to $P_4$ on the patterned surface 5 are formed at respective points $P_1'$ to $P_4'$ on the patterned image plane 5', in such a manner that the pattern of alternating clear and opaque lines in the surface 5 will align on the plane 5' in a direction parallel to the imaging optical axis $L_1$–$L_2$. In the embodiment shown, the light source will project light, for example, red light which is in the wavelength region of low luminosity where the human eye is practically insensitive.

Figures 10, 11:
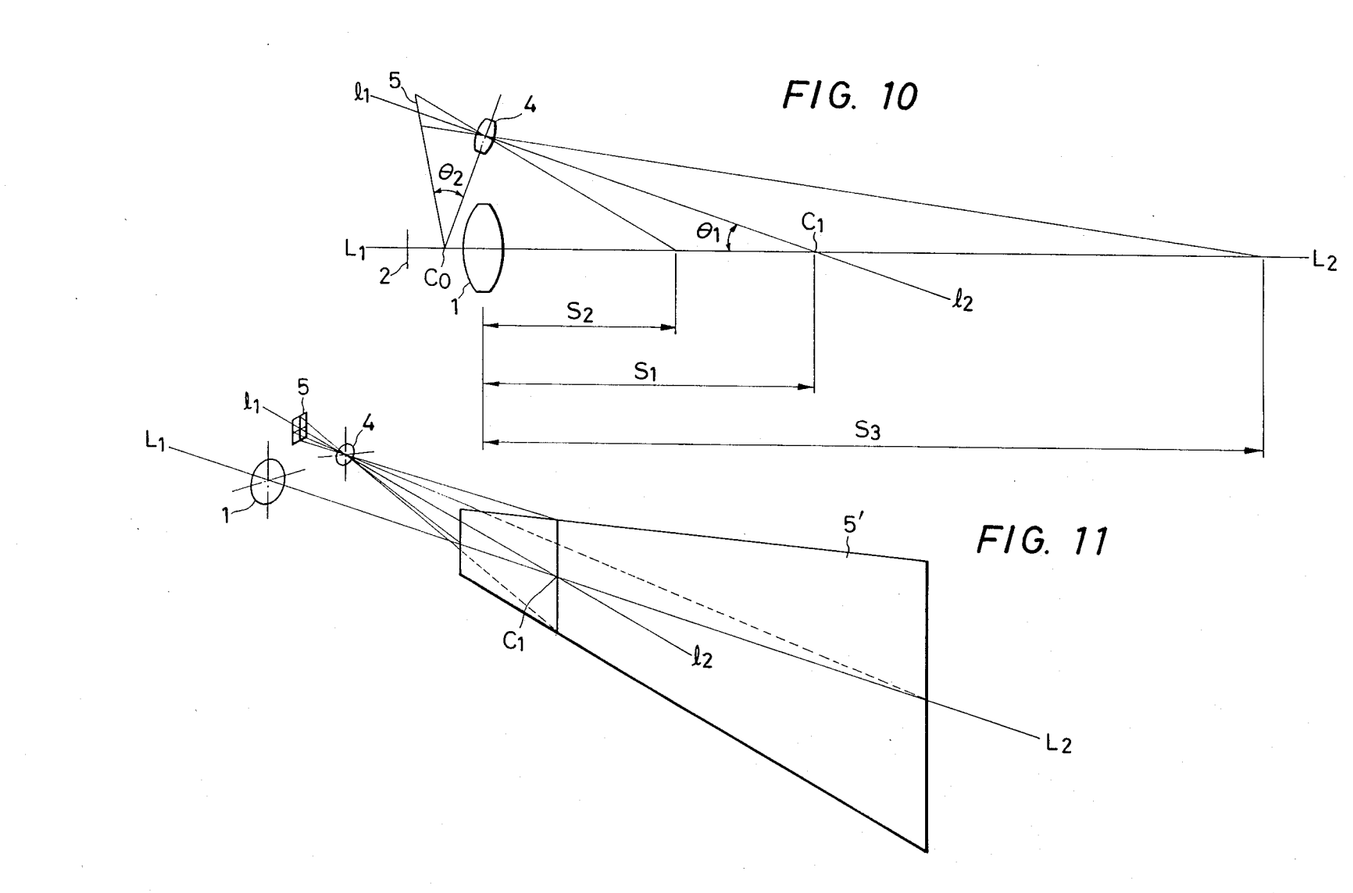
FIG. 10 is a side view showing various design parameters of the optical system shown in FIG. 6, the parameters assuming the numerical values specified herein.
FIG. 11 is a perspective view showing a modification of the layout of the optical system shown in FIG. 6.

Three design dimensions $S_1$, $S_2$ and $S_3$, and two angles $\theta_1$ and $\theta_2$ for the components of the projecting optical unit 3 are indicated in FIG. 10.

The angle $\theta_1$ is the relative inclination of the two optical axes $l_1$–$l_2$ and $L_1$–$L_2$ and the angle $\theta_2$ is the inclination of the patterned surface 5 with respect to the projection lens 4. The design dimension $S_1$ is the location of the intersection of the two optical axes $l_1$–$l_2$ and $L_1$–$L_2$ and $S_2$ and $S_3$ define the longitudinal limits of the patterned image plane 5 and thus the limits of the AF mechanism of the invention. The design dimensions and the angles may have the following values assuming 8 mm for the focal length (f) of the projection lens 4:

TABLE

| | |
|---|---|
| $S_1$ = 1.668 m | $\theta_1$ = 2.2° |
| $S_2$ = 1 m | $\theta_2$ = 7.3° |
| $S_3$ = 5 m | |

In the embodiment described above, if the object is situated on the patterned image plane 5', a sharp patterned image of good contrast can always be projected irrespective of the distance to the object.

The patterned image plane 5' can be enlarged by increasing the size of the patterned surface 5 and if its size is increased and a brighter illumination provided by the light source 6, the range of focus detection can be extended to the farthest point that is permissible by the detection capacity of the optical unit 3.

Focus detection, whether it is achieved by the active or passive method, is directed to only part of the imaging range, which is generally referred to as the distance measuring zone. In the embodiment being considered, this distance measuring zone is set to lie in the neighborhood of the optical axis $L_1$–$L_2$ of the imaging lens. Therefore, in the embodiment described above, the optical axis $L_1$–$L_2$ of the imaging lens 1 is situated on the patterned image plane 5' in order to enable precise focus detection and focus adjustment.

The apparatus according to the embodiment described above can be fabricated in a compact size because the single light projecting optical unit 3 is capable of covering any of the objects that are within the distance metering zone, which is fairly large. As a further advantage, this unit which is an integral combination of the projection lens 4, patterned surface 5 and the light source can be readily assembled into the camera body such as to satisfy the requirements for the layout specified by the present invention.

In the embodiment described above, the projecting optical unit 3 is disposed above the imaging lens 1 but this is not the only layout that can be employed to allow the optical axis $L_1$–$L_2$ of the lens 1 to be situated on the patterned image plane 5'. Equally good results are attained even when this unit is disposed exactly on the side of the imaging lens 1, as shown in FIG. 10. In other words, the optical unit 3 may be disposed at any location around the imaging lens 1.

As just mentioned in the preceding paragraph, the optical axis $L_1$–$L_2$ of the imaging lens 1 does not necessarily have to be included in the patterned image plane 5'. If the object within the distance metering zone can be provided with a detectable contrast, the patterned image plane 5' may be poistioned in other attitudes such as to cross the imaging optical axis $L_1$–$L_2$ at a single point or to lie parallel to the axis the imaging optical. Even in these cases, results which are comparable to those attained in the embodiment described above can be obtained. The position of the patterned image plane 5' can be changed by any appropriate method such as altering the position at which the light projecting optical unit 3 is disposed or the angle at which the projection lens 4 is inclined with respect to the patterned surface 5 as long as the patterned image plane 5' lies within the field of view of the imaging lens 1.

The embodiment described above concerns the case in which the distance metering zone is set in the neighborhood of the optical axis $L_1$–$L_2$ of the imaging lens 1. Even if the metering zone is set to lie in other regions, equally good results can be attained by positioning the patterned image plane 5' to be situated in substantial agreement with this zone.

In the first embodiment, the extensions of the patterned surface 5 and the plane 4a though the projection lens 4 that crosses its optical axis $l_1$–$l_2$ at a right angle intersect each other at the point $C_o$ on the imaging optical axis $L_1$–$L_2$. However, substantially equal results are attained if the crossing point $C_o$ is located slightly away from the optical axis $L_1-L_2$ because what occurs in this case is simply that the patterned image rotates slightly about the point $C_1$. Another embodiment which is related to the embodiment of FIG. 10 is illustrated for one focusing position in FIG. 15 and is further illustrated for several focusing positions in FIG. 16. According to this embodiment, the patterned surface 5 has a normal $n_1-n_2$ which is inclined with respect to the optical axis $l_1-l_2$ of the projection lens 4 as well as being inclined with respect to the optical axis $L_1-L_2$ of the imaging lens 1. Such an inclination of the patterned surface 5 is a special case of inclining either the projection lens 4 and/or the patterned surface 5 in order to obtain an effective illumination field along the optical axis $L_1-L_2$ of the imaging lens 1.

Figure 15:
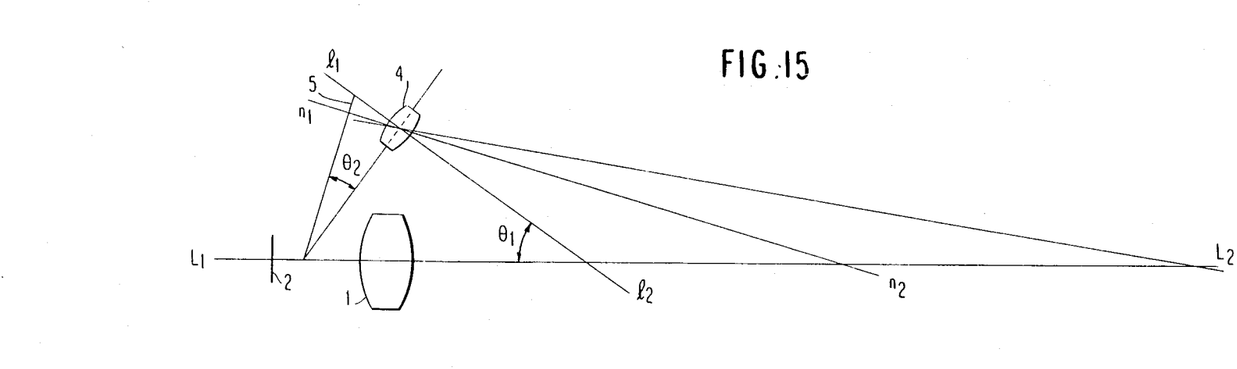
FIGS. 15 and 16 show another embodiment of the focus detecting auxiliary light projecting apparatus according to the invention in which the normal of the patterned surface is inclined with respect to the axis of the projection lens.
Figure 16:
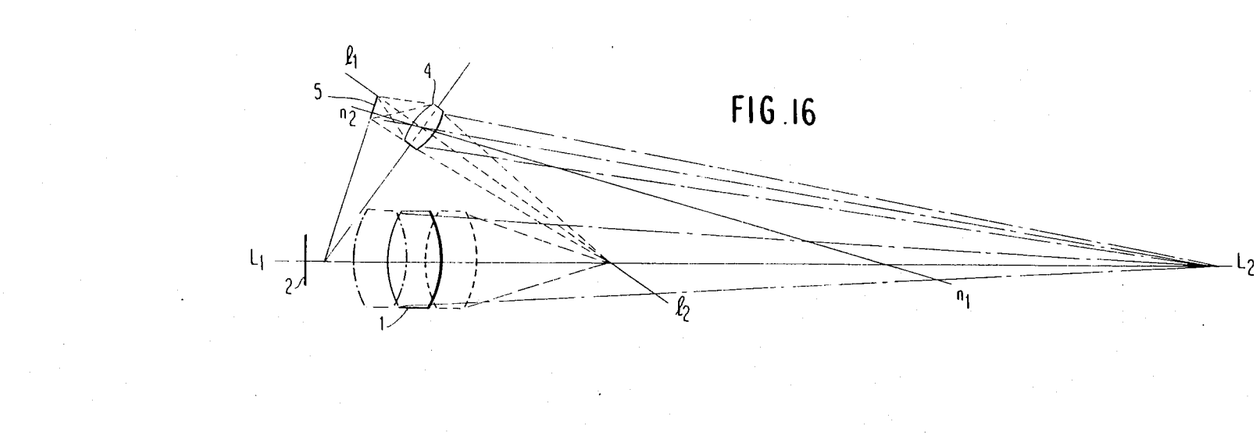

It is noted that the normal $n_1-n_2$ intersects the optical axis $L_1-L_2$ in the embodiment of FIGS. 15 and 16 while such a normal in the embodiment of FIG. 10 does not intersect the optical axis $L_1-L_2$ in front of the imaging lens 1. This difference results from the relative size of $\theta_1$ and $\theta_2$ in the two embodiments. Furthermore, in the embodiment of FIGS. 15 and 16, the normal $n_1-n_2$ of the patterned surface 5 intersects the optical axis $L_1-L_2$ of the imaging lens 1 on the side away from the imaging lens 1 of the point where the optical axis $l_1-l_2$ of the projection lens 4 intersects the optical axis $L_1-L_2$. This relationship follows from the fact that the planes containing the patterned surface 5 and the projection lens 4 intersect on the optical axis $L_1-L_2$.

The foregoing embodiment assumes the case in which the present invention is applied to an automatic focus detecting apparatus that is intended to be used in a still camera equipped with a TTL-type AF system. It should, however, be noted that the concept of the present invention is also applicable to a movie camera (TV camera) and to a camera that employs a focus detecting optical system which is independent of an imaging optical system.

In the embodiment described above, the patterned surface 5 is disposed separately from the light source but, needless to say, the patterned surface may be formed as an integral part of the radiating surface of the light source.

Varied Intensity Pattern

One embodiment of the present invention according to its second aspect is hereunder described with reference to FIGS. 12 to 14 in which the components which are the same as those employed in the first aspect of the present invention are identified by the same numerals and will not be described in detail.

Figure 12:
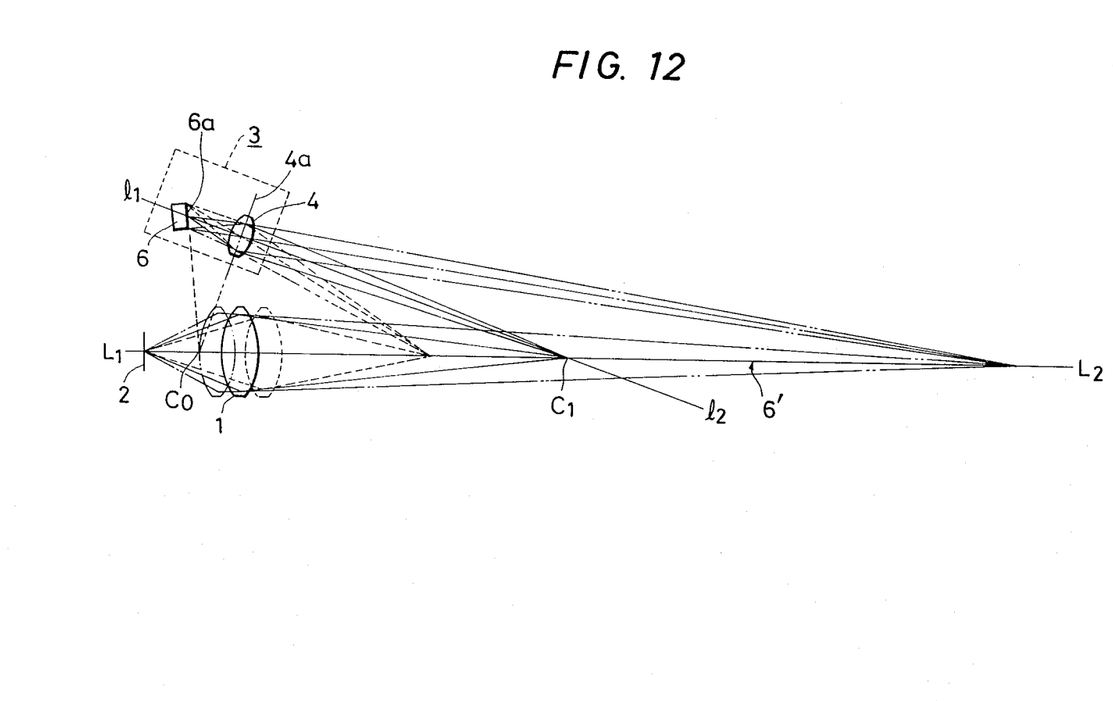
FIG. 12 is a side view showing the configuration of the optical system used in the apparatus.
Figure 13:
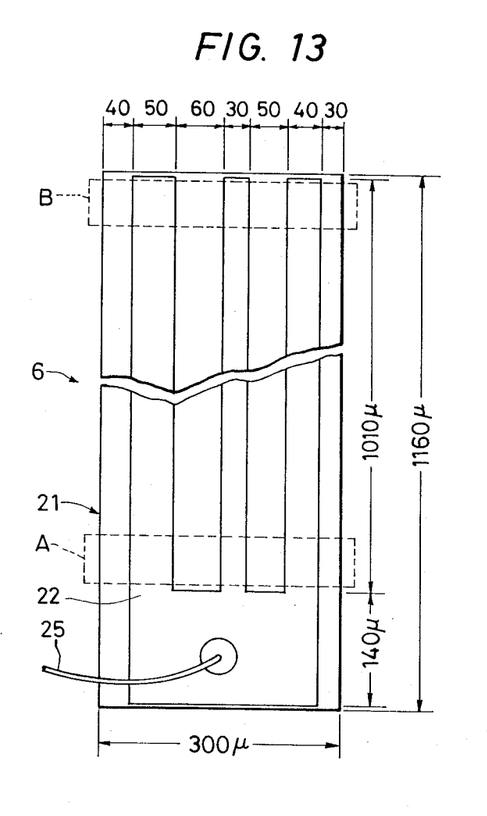
FIG. 13 is a perspective view of the light-emitting device shown in FIG. 12.

In the optical system shown in FIG. 12, a light projecting optical unit 3 consisting of a projection lens 4 and a light-emitting device 6 is disposed above an imaging lens 1 and the optical axis $l_1-l_2$ of the projection lens 4 is inclined to the optical axis $L_1-L_2$ of the imaging lens 1 such that the two optical axes intersect each other at point $C_1$.

The light-emitting device 6 is a light-emitting diode whose radiating surface 6a has an an integral part thereof a patterned surface for forming a patterned image. As shown in FIGS. 13 and 14, the light-emitting diode 6 consists of a semiconductor chip 21 that has electrode plates 22 and 23 attached to opposite sides that are parallel to the p-n junction of the semiconductor. The upper electrode plate 22 serves as the radiating surface.

The radiating surface 6a of the light-emitting device 6 is inclined with respect to a plane 4a that extends through the projection lens 4 at a right angle to its optical axis $l_1-l_2$ so that a patterned image plane 6' that is conjugate to the radiating surface 6a will be formed in a spatially inclined manner with respect to the radiating surface 6a. The imaging structure is the same in the case of the already described first aspect of the present invention.

As is well known, the amount of light reflected form the object decreases in proportion to the square of the distance from the object. Therefore, if the light-emitting device 6 has a constant intensity of radiation over the entire surface, its focus detecting capability will decrease as the distance to the object increases. In order to avoid this, the output of the light-emitting device 6 must be set to such a value that the object can be provided with a focus-detectable contrast even if it is located at the farthest end $S_3$ of the intended focusing range. However, if the output of the light-emitting device 6 is set in this way, a substantial portion of the light emitted to be projected to a near-distant object is simply wasted.

In order to solve this problem, the light-emitting device 6 used in the focus detecting auxiliary light projecting apparatus of the present invention has a gradient of radiation intensity across the radiating surface 6a and is so positioned that a high-intensity area of the device 6 will illuminate an object at a far distance while a low-intensity area thereof will illuminate an object at a near distance.

In the embodiment shown, the light-emitting device 6 is provided with a gradient of radiation intensity by causing current to flow between the electrode plates 22 and 23 at different densities at different areas of the radiating surface 6a. More specifically, the electrode plate 22 attached to one side of the semiconductor chip 21 is shaped in an interdigital form, as shown in FIG. 13 at a magnified scale. The interdigitated pattern of the opaque electrode plate 22 forms the patterned image. A lead wire 25 extending from a terminal 24 is bonded to one longitudinal end of this electrode plate 22. The bonded end of the electrode plate 22 is located on the end nearest the imaging optical axis $L_1-L_2$ and corresponds to the furthest extent $S_3$ of the metering zone. The resistance of the arms of the electrode plate 22 is comparable to the resistance of the p-n junction. Therefore, more current flows through the p-n junction, and thus produces more intense light, at the end nearer the lead wire 25. The other electrode plate 23 is so formed, as shown in FIG. 14, that it efficiently contacts the entire surface of the other side of the semiconductor chip and is integral with a terminal 26 on the side. An example of the dimensions of the upper surface electrode plate 22 is also given in FIG. 13.

Figure 14:
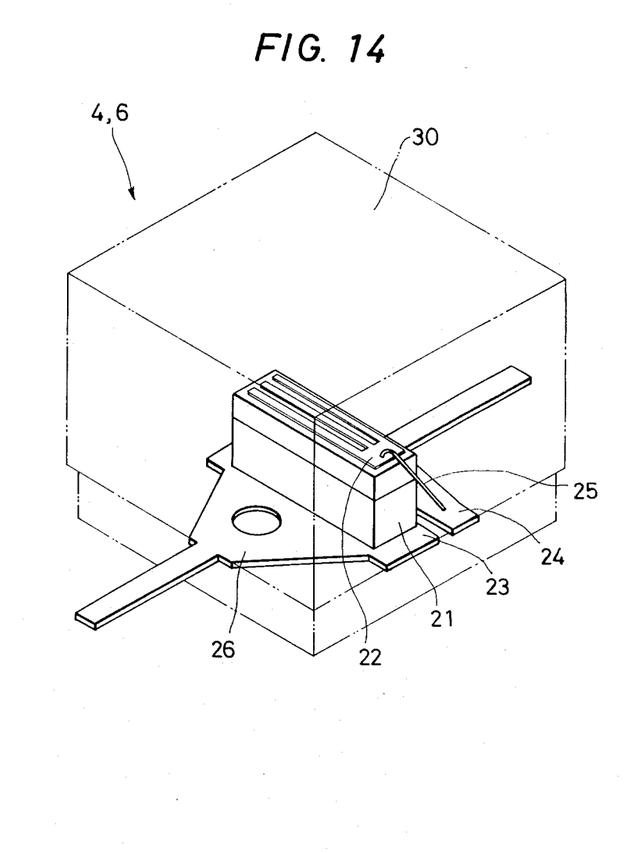
FIG. 14 is plan view of the radiating surface of the same light-emitting device.

The components of the light-emitting device 6 are molded with a transparent resin (e.g. an acrylic resin) as depicted by the one-long-and-two-short dashed line in FIG. 14, with only part of the terminals 24 and 26 projection from the plastic casing. A condenser lens portion 30 is formed on the side of the resin casing from which the emitted light will emerge.

When a voltage is applied between the terminals 24 and 26 on the light-emitting diode 6 having the construction described above, light is emitted from the p-n junction of the semiconductor chip 21 and emerges from the side where the electrode plate 22 is provided.

Since this electrode plate 22 functions as a patterned surface, the light emanating from the device 6 is already patterned.

The density of current flowing between the electrode plates 22 and 23 is subject to variation on account of such factors as the position at which the lead wire 25 is bonded to the electrode plate 22 and a specific configuration of the electrode plate and this is also responsible for the production of a gradient of radiation intensity the radiating surface 6a.

According to the experimental data attained by the present inventors, the intensity of light radiating from the brightest area of the radiating surface 6a (as defined by the dashed line A in FIG. 8) is about twice as much as the intensity of light radiating from the darkest area (as defined by the dashed line B). A specific value of the relative intensity of radiation can be appropriately determined by modifying the configuration of the electrode plate 22 or the position at which the lead wire 25 is bonded thereto.

If the light-emitting diode described above is used as the light-emitting device 6 in the focus detecting auxiliary light projecting apparatus of the second aspect of the present invention, the brightness of the patterned image projected to the object) is effectively decreased if the object is at a near distance and is increased if it is at a far distance. This leads to efficient utilization of the energy of light radiating from the light-emitting device 6 and energy conservation can be realized without sacrificing the system capability of focus detection. In addition, since the patterned surface is formed as an integral part of the light source, the overall size of the light projecting optical unit 3 can be reduced.

By properly adjusting the gradient of intensity of light radiating from the light-emitting device 6 or the layout of the light projecting optical unit 3, a focus detecting apparatus which reads the patterned image on the object by way of the imaging lens 1 can feature a substantially constant contrast for the patterned image irrespective of the distance to the object. In this case, the focus detecting apparatus operates with consistent accuracy of detection and the energy saving offered by the auxiliary light projecting apparatus of the present invention can be realized in an ideal manner. The intensity of light may be in proportion to a distance from the light source to the object to be projected or may preferably be in proportions to the square of the distance.

The other modes of action and advantages of the focus detecting auxiliary light projecting apparatus according to the second aspect of the present invention, and possible modifications of the layout of the light projecting optical unit 3 may be readily understood by those skilled in the light of the description of the first aspect of the invention and need not be explained in detail.

According to the focus detecting auxiliary light projecting apparatus incorporating the first aspect of the present invention, a sharply patterned image can be projected to the object over a wide range of distance. The apparatus is compact and can be readily integrated in the body of a camera.

In addition to these advantages, the focus detecting auxiliary light projecting apparatus according to the second aspect of the present invention enables efficient utilization of the energy of light radiating from the light-emitting device to thereby achieve energy a saving. As a further advantage, the unitary combination of the light source and the patterned surface contributes to a further reduction in the overall size of the apparatus.

What is claimed is:

1. A focusing device, comprising:
    means for detecting a focusing condition of a first lens relative to an object along a first optical axis of said first lens;
    a patterned surface having a patterned image; and
    a projection lens for projecting said patterned image of said patterned surface onto said object at least during an operation of said detecting means and having a second optical axis, said patterned surface being inclined to a plane passing through said projection lens at a right angle to said second optical axis, wherein a normal to said patterned surface intersects said first optical axis on the same side of said first lens as said object, and wherein said patterned surface is shifted in a direction away from said first optical axis and perpendicular to said normal in comparison with a positioning of said patterned surface such that a normal to said patterned surface intersects said first optical axis on an opposite side of said first lens as said object.

2. A focusing device as recited in claim 1, wherein said projected patterned image is conjugate to said patterned image of said patterned surface.

3. A focusing detecting auxiliary light projecting apparatus having a projection lens for projecting a patterned image onto an object and a patterned surface for forming said patterned image, said patterned surface being inclined to a plane passing through said projection lens at a right angle to an optical axis of said projection lens so that a patterned image plane which is conjugate to said patterned surface will be formed by said projected patterned image to be spatially inclined with respect to said patterned surface, said patterned surface being shifted in a direction away from an intersection of said plane and a first line passing through said patterned surface in comparison with a positioning of said patterned surface with respect to said projection lens such that a second line, parallel to a normal to said patterned image plane and passing through said intersection, also passes through an interior of an angle between said plane and said first line.

4. A focusing device, comprising:
    means for detecting a focusing condition of a first lens relative to an object along a first optical axis of said first lens;
    a patterned surface having a patterned image; and
    a projection lens for projecting said patterned image of said patterned surface onto said object at least during an operation of said detecting means and having a second optical axis, a plane passing through said projection lens at a right angle to said second optical axis being inclined with respect to said patterned surface, wherein a normal to said patterned surface intersects said first optical axis on the same side of said first lens as said object, and wherein said patterned surface is shifted in a direction away from said first optical axis and perpendicular to said normal in comparison with a positioning of said patterned surface such that a normal to said patterned surface intesects said first optical axis on an opposite side of said first lens as said object.

5. A focusing device as recited in claim 4, wherein said patterned image projected onto a plane is conjugate to said patterned image of said patterned surface.

6. A focusing device as recited in claim 4, wherein such second optical axis intersects said first optical axis.

7. A focusing device as recited in claim 6, wherein a first plane containing said patterned surface and said plane passing through said projection lens intersect at said first optical axis.

8. A focus detecting auxiliary light projecting apparatus having a projection lens for projecting a patterned image onto an object and a patterned surface for forming said patterned image, a plane passing through said projection lens at a right angle to a first optical axis of said projection lens being inclined with respect to said patterned surface so that a patterned image plane which is conjugate to said patterned surface will be formed by said projected patterned image to be spatially inclined with respect to said patterned surface, said patterned surface being shifted in a direction away from an intersection of said plane and a first line passing through said patterned surface in comparison with a positioning of said patterned surface with respect to said projection lens such that a second line, parallel to a normal to said patterned image plane and passing through said intersection, also passes through an interior of an angle between said plane and said first line.

* * * * *